US008613662B2

(12) United States Patent
Morrow et al.

(10) Patent No.: US 8,613,662 B2
(45) Date of Patent: Dec. 24, 2013

(54) ALTERABLE STORAGE MEDIA GAMING MACHINE

(75) Inventors: James Morrow, Sparks, NV (US); Lawrence McAllister, Las Vegas, NV (US); Robert Dubner, Westwood, NJ (US); David Carman, Glenwood, MD (US)

(73) Assignee: Bally Gaming, Inc., Las Vegas, NV (US)

( * ) Notice: Subject to any disclaimer, the term of this patent is extended or adjusted under 35 U.S.C. 154(b) by 329 days.

(21) Appl. No.: 12/788,181

(22) Filed: May 26, 2010

(65) Prior Publication Data

US 2010/0234101 A1 Sep. 16, 2010

Related U.S. Application Data

(63) Continuation of application No. 11/065,757, filed on Feb. 24, 2005, now Pat. No. 7,749,076, which is a continuation-in-part of application No. 10/243,912, filed on Sep. 13, 2002, now abandoned.

(51) Int. Cl.
*G06Q 99/00* (2006.01)

(52) U.S. Cl.
USPC .......................................................... 463/29

(58) Field of Classification Search
USPC .......................................................... 463/29
See application file for complete search history.

(56) References Cited

U.S. PATENT DOCUMENTS

| 5,991,751 | A  | * | 11/1999 | Rivette et al. ........................ 1/1 |
| 6,281,894 | B1 | * | 8/2001  | Rive .............................. 715/705 |
| 7,168,089 | B2 | * | 1/2007  | Nguyen et al. ..................... 726/4 |
| 7,294,056 | B2 | * | 11/2007 | Lowell et al. .................... 463/17 |
| 2002/0116615 | A1 | * | 8/2002 | Nguyen et al. ................. 713/168 |
| 2003/0208638 | A1 | * | 11/2003 | Abrams et al. ................ 709/328 |
| 2003/0216172 | A1 | * | 11/2003 | LeMay et al. .................. 463/29 |
| 2004/0185931 | A1 | * | 9/2004 | Lowell et al. .................. 463/17 |

\* cited by examiner

*Primary Examiner* — James D Nigh
(74) *Attorney, Agent, or Firm* — Marvin Hein

(57) ABSTRACT

A system for verifying one or more downloaded components 54 of a gaming device 10 that includes the gaming device, which has an alterable hard drive 80 (or other persistent storage media 90), and the downloaded components that further include gaming-related content 92-96. A related method includes: enabling initiation of a game on the gaming device 10; downloading the gaming-related content 92-96 to the alterable hard drive 80 while the gaming device 10 is enabled for game play; reading an identifier associated with the gaming-related content 92-96; verifying that the identifier is valid (using verification software 70); and reconfiguring the gaming device 10 to utilize the newly-downloaded, gaming-related content 92-96 in response to an initiating event.

15 Claims, 7 Drawing Sheets

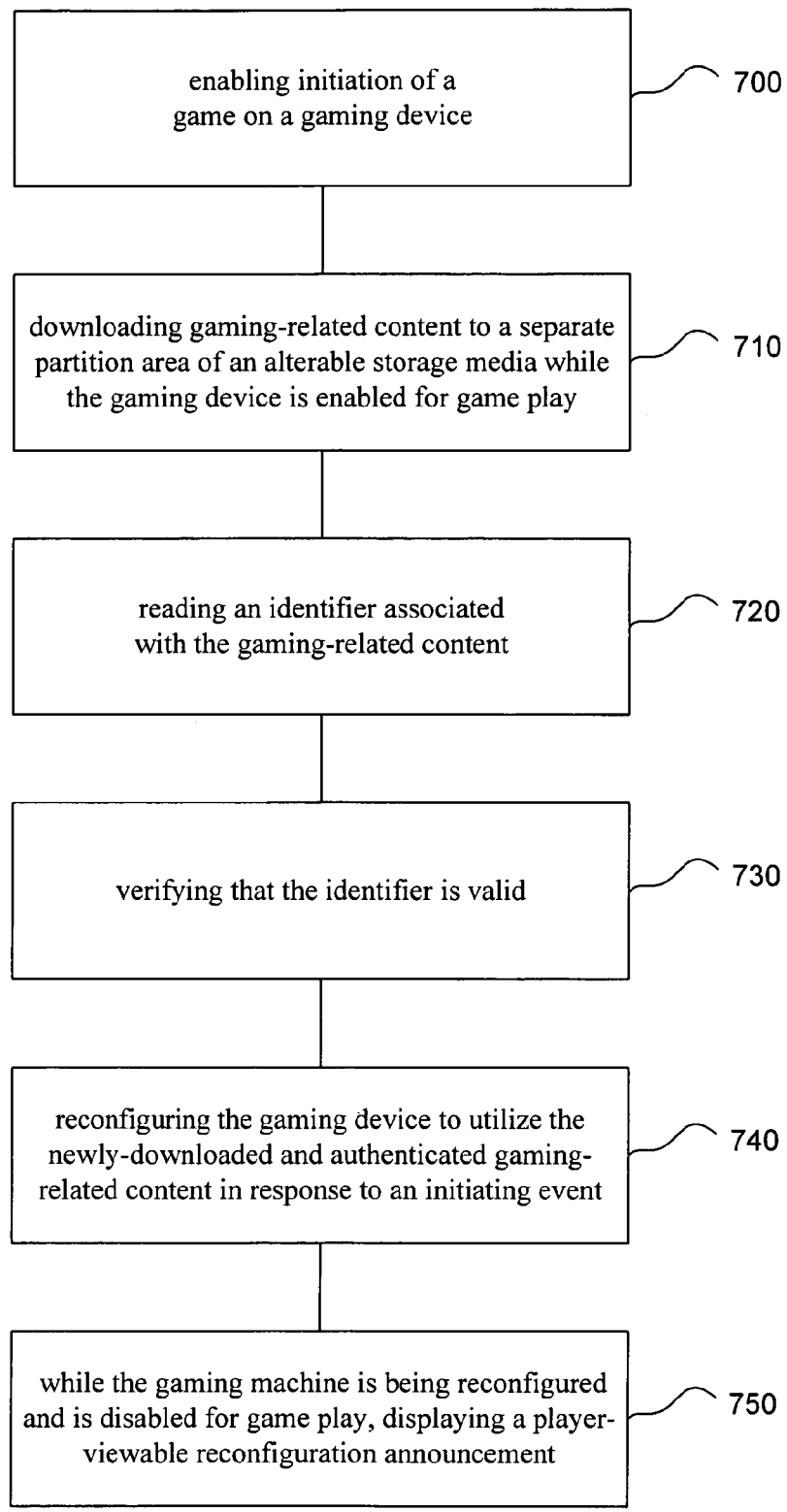

ALTERABLE STORAGE MEDIA GAMING MACHINE

RELATED APPLICATIONS

This application is a continuation of co-pending application Ser. No. 11/065,757, filed Feb. 24, 2005, which is a continuation-in-part of U.S. patent application Ser. No. 10/243,912 filed Sep. 13, 2002, entitled DEVICE VERIFICATION SYSTEM AND METHOD, now abandoned; both of which are hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to a method and apparatus for downloading data to an alterable storage media and, more particularly, for downloading data to an alterable storage media that is escrowed and then later verified as authorized for download.

2. Description of the Related Art

It is common practice in the prior art, in the gaming machine environment, that verification of a device may occur by testing the entire contents of a read only memory (ROM) containing the application software for the device to ensure that tampering has not occurred, after a prize is won during game play. An abbreviated bit string is computed from the gaming application program and stored in a secure ROM that is separate from the ROM where the gaming application is stored before deployment of the gaming machine. When the gaming machine is started, or at times when verification is desired, for example, after a win occurs during game play, a verification program calculates another abbreviated bit string from the contents of the ROM wherein the gaming application program is stored, and the previously computed abbreviated bit string stored in the secure ROM is used with the newly-calculated abbreviated bit string to verify the gaming application program.

Such a verification system may be adequate where the media on which the gaming application is stored is read-only, and therefore difficult to alter, and where there is little danger that the other components of the device can be compromised to breach security, such as a casino with 24-hour surveillance. However, such constant surveillance is not always available, both inside and outside the gaming industry, and as technology advances, it becomes more difficult to rely on these safeguards. Furthermore, the shortcomings of prior systems become more prevalent when several devices are connected over a network.

Accordingly, there has been a long existing need for enhanced verification of devices, and more enhanced self-critical analysis of their components other than just the application software.

SUMMARY OF THE INVENTION

Briefly, and in general terms, the claimed invention provides an improved method and system for verifying a device, having various components, before or during use. More particularly, by way of example and not necessarily by way of limitation, the claimed invention provides a system and method for verifying a device by verifying the components of that device. The components may comprise, for example, software components, firmware components, hardware components, or structural components of an electronic device. These components include, without limitation, processors, persistent storage media, volatile storage media, random access memories, read-only memories (ROMs), erasable programmable ROMs, data files (which are any collections of data, including executable programs in binary or script form, and the information those programs operate upon, sound files, picture files, and the like), device cabinets (housings) or cathode ray tubes (CRTs). Identification numbers or strings of the components are read and then verified. The process of verifying may comprise algorithmically verifying each identifier in a datastore to determine whether each identification number is valid. In the case where a data file comprises one of a plurality of operating system files, verification of that file, in effect, comprises verifying part of an operating system. For data files, the file names may comprise the identifiers.

Preferably, the datastore may comprise a relational database, object database, a flat file, an ASCII list, registry entries, an XML file, or any other type of commonly known data listing. However, in the case where storage space is limited for the verification system, a flat file structure for the database may be more desirable, and require less software instructions to read and retrieve information therefrom. The datastore may also comprise an independent system stack of bindings, which comprise numbers, identification strings or signatures in the datastore for algorithmically verifying or authenticating the components, or from manufacturers of the components, each identification number being verified using the binding from the manufacturer of the respective component to verify the component. Especially in the context of smaller devices such as personal digital assistants (PDAs), such a system stack may comprise a subset of one or more global component datastores containing bindings from manufacturers of the components, each binding of the subset being associated with at least one of the identification numbers of one of the components in the device. Providing such a limited subset helps control the size of the verification system by controlling the size of the datastore. Another example of a verification system in which it may be desirable to limit the size of the datastore is one in which the datastore is stored in a personal computer's (PC's) complementary metal oxide semiconductor memory (CMOS), along with other configuration settings for the PC. Storing the datastore in the CMOS may improve security wherein the PC may be configured such that only users with administrative passwords may change the content of the portion of the CMOS containing the datastore.

Structural components, such as cabinets, may contain an electronic identification chip embedded within them, such as a so-called Dallas chip or an IBUTTON device manufactured by Dallas Semiconductor of Dallas, Tex. These devices allow a unique identifier, placed within a semiconductor or chip, to be placed on a component that may or may not be electronic, such as a computer or gaming machine cabinet. The IBUTTON device is a computer chip enclosed in a 16 mm stainless steel can. The steel button can be mounted, preferably permanently or semi-permanently, on or in the structural component. Two wires may be affixed to the IBUTTON device, one on the top, and one on the bottom, to exchange data between the IBUTTON device and a processor, serial port, universal serial bus (USB) port, or parallel port.

The verifying process may comprise algorithmically verifying each identification number based on the type of component that the identification number identifies. The identification number and the type of component are algorithmically verified in the datastore in order to verify that the identification number is valid. The reading of the identification numbers and verifying the components may be performed at the time of start-up of the device, or periodically during operation of the device. Operation of the device may be stopped if any one of the identification numbers is not algorithmically verified in the datastore. In the case of a game or gaming machine type of device, a tilt condition message is generated, if any one of the identification numbers is not algorithmically verified in the datastore.

The datastore may consist of a set of signatures, also called bindings. At least with respect to the components that comprise data files or firmware, a well-known hash function, the Secure Hash Function-1, also known as SHA-1, may be used to compute a 160-bit hash value from the data file or firmware contents. This 160-bit hash value, also called an abbreviated bit string, is then processed to create a signature of the game data using an equally well-known, one-way, private signature key technique, the Digital Signature Algorithm (DSA). The DSA uses a private key of a private key/public key pair, and randomly or pseudo-randomly generated integers, to produce a 320-bit signature of the 160-bit hash value of the data file or firmware contents. This signature is stored in the datastore in addition to the identification number. In other preferred embodiments, a stronger Secure Hash Function is used (e.g., SHA-256, SHA-512, and the like).

Either contained in the device, or attachable to the device, is a processor and a memory containing executable instructions or a software program file for verification of the components (verification software), which may itself be one of the components to verify. The verification software may be stored on a persistent storage media, such as a hard disk device, read only memory (ROM), electrically erasable programmable read-only memory (EEPROM), in the aforementioned CMOS memory, battery-backed random access memory, flash memory or other type of persistent memory. Additionally, the verification software may also be stored on volatile storage media, such as random access memory (RAM). Preferably, the verification software is stored in a basic input/output system (BIOS) on a solid-state persistent memory device or chip. BIOS chips have been used for storing verification software, such as the BIOS+ chip used by Bally Gaming, Inc. of Las Vegas, Nev. in their EVO™ gaming system. Placing the verification software in the BIOS is advantageous because the code in the BIOS is usually the first code executed upon boot or start-up of the device, making it hard to bypass the verification process.

Alternatively, the verification software may be stored in a firmware hub, which may comprise an electronic device or computer that stores BIOS information. In personal computer hub technology, such as that manufactured by the Intel Corporation of Santa Clara, Calif., a hub is used in place of a peripheral component interconnect (PCI) bus to connect elements of chipsets.

The persistent storage media may be a removable storage unit such as a CD-ROM reader, a WORM device, a CD-RW device, a floppy disk device, a removable hard disk device, a ZIP disk device, a JAZZ disk device, a DVD device, a removable flash memory device, or a hard card device. However, the datastore is preferably stored in a non-removable, secure device either within the device being verified, or remotely on a server, in order to enhance security.

The verification software executes a DSA verification of the data files and firmware components. Also stored in the datastore is the public key of the private key/public key pair. For each data file and firmware component, as part of the DSA verification, the processor and verification software first computes the hash value of the digital contents of the component using the SHA-1 algorithm. The verification software then processes or authenticates this computed hash value, using the DSA signature verification algorithm, which also takes, as input, the aforementioned public key stored in the datastore. The verification part of the DSA produces a Boolean result (yes or no) as to whether the inputs solve the algorithm. If the algorithm is not solved by the inputs, then an unexpected result is produced, thereby failing to verify the particular component. This may cause a fault tilt to occur to prohibit the loading operation of the device. Otherwise, use of the device is permitted. A detailed description of the DSA can be found in the U.S. Government's Federal Information Processing Standards Publication (FIPS) 186-2. That publication describes each step of the DSA signature generation and verification.

Alternatively, the set of executable instructions may use the Rivest-Shamir-Adleman (RSA) algorithm to verify the components. Using the RSA algorithm, a first abbreviated bit string or hash value is computed from each component's digital contents and encrypted into a digital signature. The digital signature is stored in the datastore along with the identification number for the component. When the device is verified, the component is verified by computing a second abbreviated bit string computed from the component's digital contents. The signature is retrieved from the datastore by searching the datastore for the identification number. The signature is decrypted to recover the first abbreviated bit string. The component is then verified by comparing the second abbreviated bit string with the first abbreviated bit string. If the first and second abbreviated bit strings cannot be algorithmically verified, then the component is not verified. As discussed below, this may cause a fault tilt to occur to prohibit the loading operation of the device. Otherwise, use of the device is permitted.

Instead of creating a digital signature for, or signing, each data file individually, collections of data files may be signed together in order to speed up processing. The abbreviated bit strings, hash values, or signatures, also called digests, of the collection of data files are collected into a catalog file, and the catalog is signed as described above.

In some cases, it may be desirable to nevertheless allow operation of a device even though a data file failed verification. For example, that data file may contain an error caused by a number of events, such as a bad sector on a hard disk, which in turn caused the failed verification of that data file. The failed verification is evidently not due to tampering of the device as the system of the claimed invention is generally designed to prevent. Still, operation of the device is not desirable unless and until the error in the data file is corrected. When the data file is stored in alterable media, correcting such an error may be as simple as replacing the file. Along with the identification number and encrypted signature or abbreviated bit string, a valid replacement data file may also be stored in the datastore. If the software program determines that the cause of the invalid file is simply due to an error in the file, and not tampering, then the replacement file is pulled from the datastore to replace the data file that failed the validation. A number of factors may be used by the software program to make such a determination. For example, determination may be based on the number of data files or components that fail validation. This may indicate a deceptive replacement of a hard disk in the device.

In one embodiment, the datastore is remote from the device, wherein verification is performed over a network connecting a datastore server containing the datastore with the device. The device transmits the identification numbers for each of the components to the datastore server. The datastore server then performs the step of algorithmically verifying. For example, the device may be a personal computer (PC), with verification being performed before a transaction is allowed on a network server. A prime example of such a system is one set up for performing banking transactions with a network server owned or operated by a bank. In such a system, a bank may only allow trusted transactions using an authorized PC whose bindings for all of the components and banking transaction software have been recorded in the datastore located on the bank's network server, or another remote network server that is accessed by the PC. Once all of the components have been verified, the bank's network server then allows transactions to take place using the PC.

In another example, the device comprises a gaming machine, wherein the verification of the gaming machine is performed before game play is allowed on the gaming machine. The datastore may either be located in a secure location in the gaming machine, such as a ROM device enclosed in a lock box within the gaming machine, or remotely from the gaming machine so that the gaming machine connects to a network server containing the datastore over a network. As with the banking personal computer described above, the components of the gaming machine are verified at the network server after the gaming machine transmits the identification numbers, hash values, and the like, to the network server.

Another aspect of the claimed invention is a method and system for recording event messages in a gaming machine. The device may comprise a gaming machine, which contains a monitor for monitoring one or more system events being processed by the gaming machine. The operating system of the gaming machine is event driven. In an event-driven system or device, applications and components respond to input from the user (mouse movement, keystrokes, menu choices, and the like) and messages from other applications and components. This is in contrast to, for example, a batch operation that continuously processes the next item from a group of instructions. The monitor comprises an event management system, which comprises software or firmware that monitors components of the device. Alternatively, the monitor may be located on a remote server, workstation or other network device. The monitor, which may comprise hardware and software components, such as a processor and event management software, monitors routine and non-routine events. As an example, a coin insertion into a gaming machine will trigger a corresponding routine coin-in event message that triggers components to operate software instructions to execute. Similarly, an exception fault or divide by zero condition will trigger a non-routine or error event message to be generated, for example. These event messages can be generally referred to as system events.

Either included within the monitor, or separately but in close coordination with the monitor, is a detector for detecting selected system events of the one or more system events so that they may be recorded. The gaming machine, or the remote server monitoring the gaming machine, stores the event message for the detected system event in a log file.

Each monitored system event has a system event type. The detector selects the selected system event based on the system event type for the selected system event. The system event type may be a code in the event message that indicates a category of events that occur in the system that the system event belongs to. For example, the previously mentioned coin-in, exception fault and divide by zero system events are each so identified with the system event type. The detector selects the selected system event by comparing the system event type for each monitored system event to a list of system event types, and selecting one of the monitored system events for the selected system event if the system event type for the selected monitored system event can be algorithmically verified with one of the system event types on the list. Each system event is monitored and as the detector selects a plurality of system events based on their types, the system event messages for each selected system event are stored in a log file. The list may be stored in an index or lookup file on a persistent storage media of one of the alterable types described above. Alternatively, the verification software may also be stored on volatile storage media, such as random access memory (RAM), as described above. The lookup file may comprise a datastore file, which may be relational, object based, or in XML format, for example. The log file may also be stored on persistent storage media.

A buffer region of a memory may be set aside for buffering a plurality of the monitored system events, wherein the step of storing comprises storing one or more of the buffered system events in the log file with the selected one of the system events each time one of the system event types is detected by the detector. Preferably, the buffer should be large enough so that at least the last 1000 system events may be stored in the buffer, and then written if a selected system event is detected and stored. The buffer is thus operated as a first-in-first-out stack of system event messages.

Other digital contents of memory or components in the device may be stored upon detection of a selected system event. For example, it may be desirable to store the entire contents of a memory component, selected contents of a memory component, or selected entire values for registers of a processor component of the gaming machine. For example, if a selected system event is a memory protection exception error, then it may be desirable to store at least the contents of the protected memory that was violated and the memory allocation tables for the offending application(s) that caused the error. Even if the memory in which the protection exception error occurred comprises a safe or battery-backed random access memory device, it nevertheless still may be desirable to store the contents in case other applications should further modify the memory.

As another aspect of the claimed invention, it is desirable to perform operations on data files, such as verification operations, such data files being stored on a persistent storage media such as a hard disk, before or without the need for loading of the operating system for an electronic device. Alternatively, the verification software may also be stored on volatile storage media, such as random access memory (RAM). Typically, the operating system must be started or booted in order to perform file access operations on the storage media. This is because the operating system usually exclusively contains the file access system used to read the file allocation structure stored on the storage media. However, in some devices, it would be desirable to validate data files on the storage media before booting the operating system for, among other reasons, security purposes.

In this regard, the system of the claimed invention has a file allocation reader stored in the basic input/output system (BIOS) or firmware hub (FWH). This makes accessing files stored in the persistent storage media (or volatile storage media) or device possible in the absence of a running and operating system. The processor may access the file allocation reader in the BIOS to open the file allocation structure on the persistent storage media and read it. For faster access, the processor may move the contents of the file allocation structure into a RAM. The processor may then process the file allocation structure to provide access to files stored on the persistent storage device.

Providing this functionality in the BIOS or FWH facilitates accessing the files stored in the storage device using a computer program stored in the basic input/output system wherein the computer program comprises a set of executable instructions for processing the file allocation structure. An example of such a computer program that may benefit from this new functionality in the BIOS or FWH is the verification program described above for verifying software components on the persistent storage media. In that case, operating system files may be verified, and this provides access to files stored on the storage media through the BIOS allowing such verification to take place before the operating system is booted, or before any software program is run from the storage media. This makes the verification software completely independent of files stored on the persistent storage media that are being verified.

As described above, verifying the data files may comprise verifying each data file by retrieving a first abbreviated bit string computed from the file from the datastore, computing a second abbreviated bit string from the data file, and verifying the file by authenticating the second abbreviated bit string using the first abbreviated bit string. As described above, the datastore of signatures or abbreviated bit strings may be stored in the BIOS as well, wherein the verification software uses DSA or RSA to verify each data file against the corresponding signature or abbreviated bit string stored in the datastore. The file allocation reader in the BIOS or FWH may be configured to read a 32-bit based file allocation table, a 16-bit based file allocation table, a WINDOWS NT file system structure, or any other file allocation structure used by the persistent storage media. Once again, alternatively, the verification software may also be stored on volatile storage media, such as random access memory (RAM).

In still another preferred embodiment, the claimed invention is directed towards a method for verifying a downloaded component of a gaming device, wherein the gaming device has an alterable hard drive (or other alterable storage media) and the downloaded component includes gaming-related content. The method includes: enabling initiation of a game on the gaming device; downloading gaming-related content to the alterable hard drive while the gaming device is enabled for game play; reading an identifier associated with the gaming-related content; verifying that the identifier is valid; and reconfiguring the gaming device to utilize the newly downloaded and authenticated gaming-related content in response to an initiating event. In one preferred embodiment of the claimed invention, the gaming-related content is divided into modular components, and the gaming device is reconfigurable to utilize at least one modular component of the newly-downloaded and authenticated gaming-related content in response to an initiating event.

Upon completion and authentication of downloaded content, the gaming device is going to wait for an initiating event in order to install or load the authenticated data. In a preferred embodiment, "initiating events" include, by way of example only, and not by way of limitation: (1) no credits on the game meters, (2) no activity at the game, game play, button pushes, card-ins, printing, and the like, (3) a period of time with no activity at the game, (e.g., 5 minutes, 10 minutes, or the like), (4) a key insertion or card insertion by an employee, (5) accessing of a special setup screen on the game by an authorized person, (6) touching a button or activation point on the screen in response to a message saying the new code is ready to load, (7) a button push or activation by an operator on the casino backend, (8) a tie-in to a video system to confirm there is no player at the game and the initiation can take place, (9) a biometric entry at the game or at the system that authorizes initiation of the code, and (10) a key opening and BKey (electronic key) entry to authorize installation or reconfiguration of the software.

In a preferred embodiment of the claimed invention "reasonableness" checks are performed as well. For example, "reasonableness" checks ensure that a gaming machine does not try to run a piece of code in a video game that is intended to spin mechanical reels. Additionally, logs are preferably kept and reported back that indicate information such as date, time, who authorized the action, and what happened (e.g., success, failure, and if failure, for what reason).

As mentioned above, gaming-related content is preferably downloaded to the alterable hard drive (or other persistent or volatile storage media) while the gaming device is enabled for game play. In a preferred embodiment, "enabled for game play" includes, by way of example only, and not by way of limitation: (1) when the gaming device is in the middle of a game (from start of wager until game over/ready-for-wager), (2) when the gaming device is between games with credits on the machine, (3) when the gaming device is between games with no credits on the machine but money-in devices enabled, (4) when the gaming device is in attract mode, (5) when the host considers the gaming device enabled, (6) when the gaming device is cashing out, and (7) when the gaming device is accepting money. The above-discussed ability of the claimed invention to "download to the alterable storage media while the gaming device is enabled for game play" is in addition to the claimed invention's ability to download to the gaming device is while the gaming device is in service or turned off (i.e., not enabled for game play). However, the ability of the claimed invention to download to the alterable storage media while the gaming device is "enabled for game play" is a significant advancement over the abilities of traditional gaming devices and systems.

Additionally, a gaming device is preferably reconfigured to utilize newly-downloaded and authenticated gaming-related content when the gaming device is "not enabled" (i.e., disabled) for game play. In this regard, in a preferred embodiment, "not enabled" (i.e., disabled) for game play includes, by way of example only, and not by way of limitation: (1) when the gaming device is disabled by the attendant (and the "GAME DISABLED" message is displayed), (2) when the gaming device is disabled by host (and the "GAME DISABLED" message is displayed), (3) when the host has sent a game disable command to the EGM (Electronic Gaming Machine), (4) when the gaming device is in "attendant diagnostics" mode, (5) when the main door is open, (6) when the diagnostics menus are available (e.g., meters, game recall, GAT (Game Authentication Terminal), and the like or in use.

Furthermore, when a gaming device is reconfigured, utilizing newly-downloaded and authenticated gaming-related content, the gaming device is "not enabled" (i.e., disabled) for game play. During the reconfiguration and possibly for a period of time thereafter, a "reconfiguration announcement" is preferably made to potential players. The reconfiguration announcement may include the "GAME DISABLED" message described above, but also includes a message that the gaming device is being reconfigured, modified, updated, or otherwise altered. This reconfiguration announcement may be audio and/or video. In one preferred embodiment, the reconfiguration announcement at least includes a message on the video screen (or other visual presentation, such as a 2-line LCD (Liquid Crystal Display), LED (Light Emitting Diode), VF (Vacuum Fluorescent) display, and the like) stating the gaming device is being reconfigured and/or was recently reconfigured so that players and potential players are made aware that a change has occurred. In this manner, players and potential players are kept fully informed of any changes occurring to the game that they are playing or considering playing. In an exemplary preferred embodiment, a reconfiguration announcement includes a message on the display screen of a gaming machine stating, "THIS GAMING MACHINE IS BEING RECONFIGURED AND/OR HAS RECENTLY BEEN RECONFIGURED." One of ordinary skill in the art will appreciate that the form and substance of this message may vary significantly without departing from the scope of the invention.

In one aspect of a preferred embodiment, the downloaded gaming-related content is authenticated on the alterable hard drive while the gaming device is enabled for game play. In accordance with another aspect, the downloaded, gaming-related content is authenticated on the alterable hard drive in response to an initiating event. In one preferred embodiment, the gaming-related content is downloadable to a separate partition area of the alterable hard drive while the gaming device is enabled for game play. Preferably, the gaming-related content is downloadable to a separate partition area of the alterable hard drive while the gaming device is enabled for game play, and wherein downloaded, gaming-related content is escrowed for later authentication. In accordance with another aspect, the gaming-related content is downloadable to a staging area while the gaming device is enabled for game play, and wherein downloaded, gaming-related content is escrowed for later authentication.

Additionally, in accordance with a preferred embodiment, the step of verifying comprises algorithmically verifying the identifier associated with the gaming-related content to a value in a datastore to determine whether the identifier associated with the gaming-related content is valid. Preferably, if the identifier is not algorithmically verified in the datastore, utilization of the gaming-related content is prevented. In another preferred embodiment, if the identifier is not algorithmically verified in the datastore, a tilt condition message is generated. In accordance with another aspect of a preferred embodiment, the datastore is remote from the gaming device, and verification is performed over a network that connects the gaming device with a database server containing the datastore. In this manner, the gaming device preferably transmits an identifier for each of the components to the database server where the verifying step is performed.

Moreover, in accordance with a preferred embodiment, the datastore is selected from a group consisting of a relational database, an object database, a flat file, an ASCII list, registry entries, and an XML file. In one preferred embodiment, the downloaded component includes a data file. In another preferred embodiment, the data file comprises a software program file. In another preferred aspect, the claimed invention further includes a persistent storage media. Preferably, the persistent storage media is a removable storage unit selected from the group consisting of: a CD-ROM reader, a WORM device, a CD-RW device, a floppy disk device, a removable hard disk device, a ZIP disk device, a JAZZ disk device, a DVD device, a removable flash memory device, and a hard card device.

Furthermore, in accordance with a preferred embodiment, unsecured components are downloaded across an unsecured network to the gaming device, after which the components are verified in the gaming device in response to an initiating event. In one preferred embodiment, the claimed invention also includes a network server that contains the database server. In accordance with another preferred aspect, the claimed invention further includes a player-viewable reconfiguration announcement that is displayed when the gaming machine is reconfigured using the downloaded gaming-related content. Preferably, the gaming machine is reconfigured using the gaming-related content while the gaming machine is disabled for game play and a player-viewable reconfiguration announcement is displayed.

In accordance with one preferred embodiment, the gaming-related content is downloaded from a server via a network. In another preferred embodiment, the gaming-related content is downloaded from a laptop computer that is connected to at least one gaming device without requiring an interconnecting network. In still another preferred embodiment, the gaming-related content is downloaded from a portable device that is connected to at least one gaming device without requiring an interconnecting network. Further, in yet another preferred embodiment, the gaming-related content is transferred to the gaming device from another proximately located gaming device, whereby each gaming device forwards gaming-related content on to another gaming device, thereby serving as a relay station.

In another preferred embodiment, the invention is directed towards a system for verifying a downloaded component of a gaming device, wherein the gaming device has an alterable hard drive, and wherein the downloaded component includes gaming-related content. The system includes a gaming device for playing a game, wherein the gaming-related content is downloadable to the alterable hard drive while the gaming device is enabled for game play. The system includes a processor for reading an identifier associated with the gaming-related content and for verifying that the identifier is valid. The gaming device is reconfigured to utilize the newly-downloaded, gaming-related content after the gaming-related content has been verified in response to an initiating event.

Preferably, the system further includes one or more sets of executable instructions that are executed by the processor, wherein the executable instructions enable reading and verifying the identifiers. In a preferred embodiment, the system further includes a persistent storage media. Preferably, at least one of the one or more sets of executable instructions is stored in persistent storage media. In a preferred embodiment, the persistent storage media can be a basic input-output chip (BIOS), a firmware hub, flash memory, and/or a hard disk device. Additionally, the persistent storage media can also be a removable storage unit, including by way of example only, and not by way of limitation: a CD-ROM reader, a WORM device, a CD-RW device, a floppy disk device, a removable hard disk device, a ZIP disk device, a JAZZ disk device, a DVD device, a removable flash memory device, and a hard card device. As discussed above, the verification software may also be stored on volatile storage media, such as random access memory (RAM).

In one aspect of a preferred embodiment, the processor reads and verifies the identifier in response to an initiating event. Initiating events, as described above, are events that have been approved by gaming regulators to begin the installation and/or reconfiguration of the newly-downloaded, gaming-related content. In another aspect of a preferred embodiment, the processor reads and verifies the identifier periodically while the gaming device is not enabled for game play. Preferably, the gaming device is capable of connecting to a network, wherein the datastore is stored on a server that is remote from the gaming device, and wherein the processor transmits an identifier to the server to algorithmically verify an identifier in the datastore.

In yet another preferred embodiment, the invention is directed towards a method for verifying a downloaded component of a gaming device, wherein the gaming device has an alterable hard drive (or other alterable storage media), and wherein the downloaded component includes gaming-related content that contains one or more data sets that have been downloaded with a manifest. The method includes: enabling initiation of a game on the gaming device; downloading gaming-related content to the alterable hard drive while the gaming device is enabled for game play on the gaming device; retrieving a first abbreviated bit string computed from each data set from a datastore; computing a second abbreviated bit string from each of the one or more data sets; verifying each data set by authenticating the second abbreviated bit string computed from the data set using the first abbreviated bit string; and reconfiguring the gaming device to utilize the newly-downloaded, gaming-related content in response to an initiating event. In one preferred embodiment, the alterable hard drive is replaced with another type of alterable storage media, as described above.

Finally, in still another preferred embodiment, the invention is directed towards a system for verifying a downloaded component of a gaming device, wherein the gaming device has an alterable hard drive (or other alterable storage media), and wherein the downloaded component includes the gaming-related content. The system includes a gaming device for playing a game, a datastore, and a processor. In the gaming device, the gaming-related content that contains one or more data sets is downloaded to the alterable hard drive while the gaming device is enabled for game play. The datastore contains a first abbreviated bit string computed from each of the one or more data sets that have been download with a manifest. In one preferred embodiment, the manifest includes, by way of example only, and not by way of limitation, a list of files, a list of individual SHA-1 hash functions, a list of DSA signatures, combinations thereof, and the like. Additionally, the processor computes a second abbreviated bit string from each of the one or more data sets, and verifies each data set by authenticating the second abbreviated bit string computed from the data set using the first abbreviated bit string. Preferably, the gaming device is reconfigured to utilize the newly-downloaded, gaming-related content after the gaming-related content has been verified in response to an initiating event. In one preferred embodiment, the alterable hard drive is replaced with another type of alterable storage media.

Other features and advantages of the invention will become apparent from the following detailed description, taken in conjunction with the accompanying drawings, which illustrate by way of example, the features of the claimed invention.

BRIEF DESCRIPTION OF THE DRAWINGS

FIG. 7 is a logical flow diagram of a preferred method for downloading and verifying a downloaded component 54 of a gaming device 10, in accordance with the claimed invention, wherein the gaming device has an alterable storage media, the downloaded component includes gaming-related content, and the gaming device is reconfigured in response to an initiating event.

DETAILED DESCRIPTION OF THE EMBODIMENTS

Figure 1:
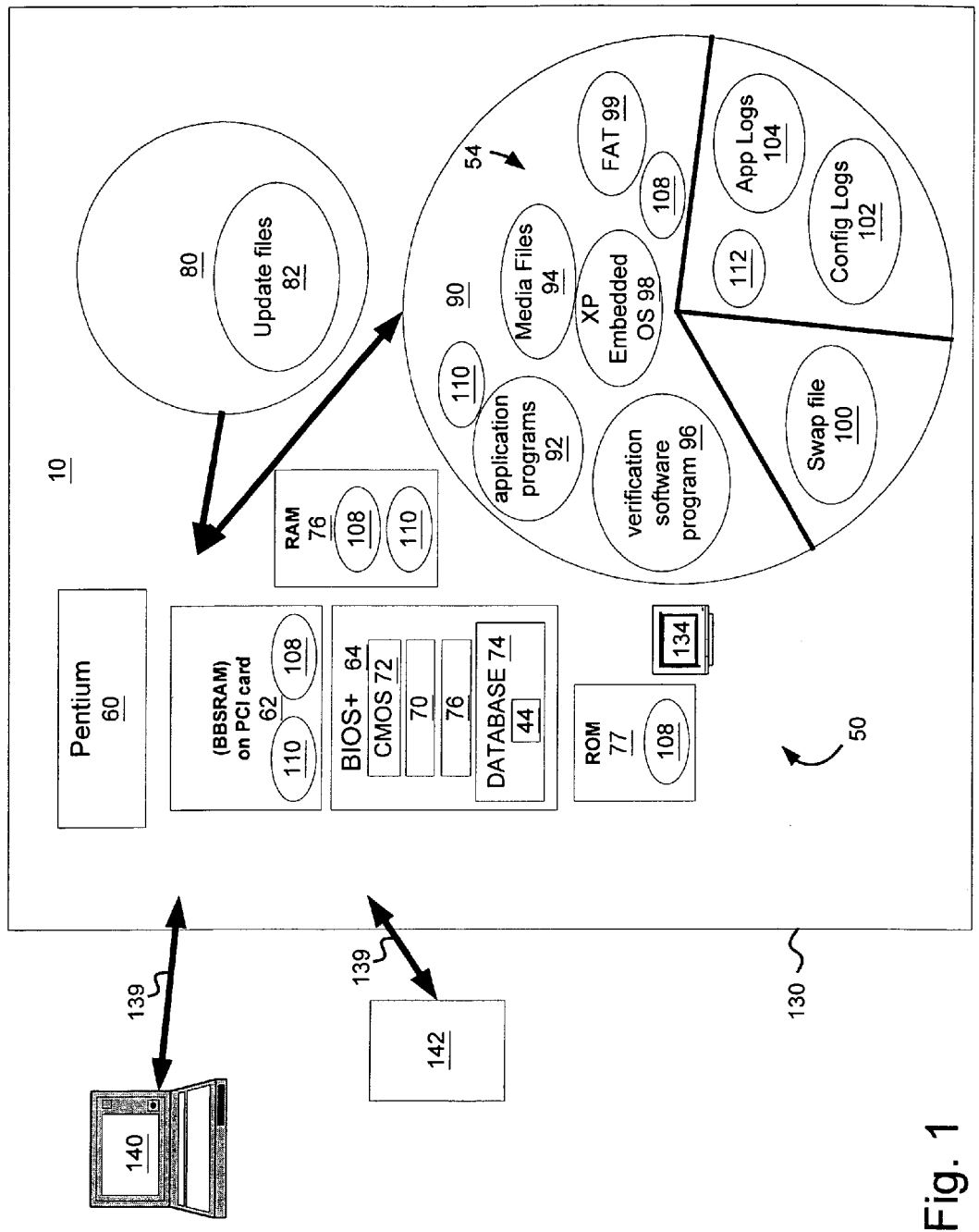
FIG. 1 illustrates a device and components capable of verification before and during use of the device using the system and methods of the claimed invention.

Referring now to the drawings, like reference numerals denote like or corresponding parts throughout the drawing figures. With reference to FIG. 1, a block diagram illustrating a device 10 and components 50 capable of verification before and during use of the device 10 utilizing the system and methods of the claimed invention is shown. The components 50 may comprise, for example, software or data file components 54, firmware components 64-74, hardware components 60, 62, 80, 90, removable flash devices, or structural components 130 of the device 10. These components include, without limitation, one or more processors 62, persistent storage media 80 and 90, volatile storage media such as random access memories (RAMs) 76, read-only memories (ROMs) 77, or electrically-erasable, programmable ROMs (EEPROMS) such as basic input/output systems (BIOS) 64. Components 50 may also include data files 54 (which are any collections of data, including executable programs in binary or script form, and the information that those programs operate upon), device cabinets (housings) 130, cathode ray tubes (CRTs) 134, or compact disk read only memory (CDROM) or CD read-write (CR-RW) storage 80. The data files 54 may include data files 100-104, software program files 92-96, operating system files 98, or file allocation tables or structures 99. Ports 139 may be included with the device 10 for connection to diagnostic systems 140 and other input/output devices 142. The ports 139 may each comprise a serial port, universal serial bus (USB) port, parallel port or any other type of known port, including a wireless port. Preferably, each of the components 50 have embedded or loaded in them identification numbers or strings that can be accessed by the processor 60, including the processor 60 itself, which are utilized for verification as explained below. The data files 54 may use their file name as their identification number of string.

Either within the device 10, or in the diagnostic system 140 attachable to the device 10, are executable instructions or a software program 70 for verification of the components (verification software 70), which may itself be one of the components 50 to verify if it is internal to the device 10. The verification software 70 may be stored on a persistent storage media such as the hard disk device 90, ROM 77, EEPROM 64, in a complementary metal oxide semiconductor memory (CMOS) 72, in safe ram comprising a battery-backed static random access memory (BBRAM) 62, in a flash memory or other type of persistent memory. Preferably, the verification software 70 is stored in a basic input/output system (BIOS) 64 device or chip. BIOS chips 64 have been used for storing prior verification software, such as previous versions of the BIOS+ chip used by Bally Gaming, Inc. of Las Vegas, Nev. in their EVO gaming system. Placing the verification software 70 in the BIOS 64 is advantageous, because the code in the BIOS 64 is usually the first code executed upon boot or start-up of the device 10, making it hard to bypass the verification process.

Alternatively, the verification software 70 may be stored in a firmware hub (FWH), which may comprise the part of an electronic device 10, which may be a computer, that stores BIOS information. Hub technology is currently being developed and used by the Intel Corporation of Santa Clara, Calif. Usually, so called north and south bridges link elements of chip sets through a peripheral component interconnect (PCI) bus. In the hub architecture, the elements are connected via an interlink dedicated bus. This is a high-speed bus, currently with twice the bandwidth of the PCI bus. Typically, the interlink bus operates at 133 MHz in 2× mode. Being 64-bits wide, the interlink provides a bandwidth of 266 MB/sec (2×133.000.000×8 byte). One such hub is known as a firmware hub (FWH). Intel's 82802 FWH stores system BIOS and video BIOS in a 4 Mbit or 8 Mbit EEPROM or flash EEPROM.

As another alternative, the persistent storage media that stores the verification software 70 may be a removable storage unit such as the CD-ROM or CD-RW device 80, a WORM device, a floppy disk device, a removable type of hard disk device 90, a ZIP disk device, a JAZZ disk device, a DVD device, a removable flash memory device, or a hard card type of hard disk device 90. However, the datastore 74 containing verification data used by the verification software 70, described below, is preferably stored either within the device 10 being verified in a non-removable, secure device, such as the BIOS+ 64 shown in FIG. 1, or remotely on a server for networked devices. Additionally, the verification software may also be stored on volatile storage media, such as random access memory (RAM).

Figure 2:
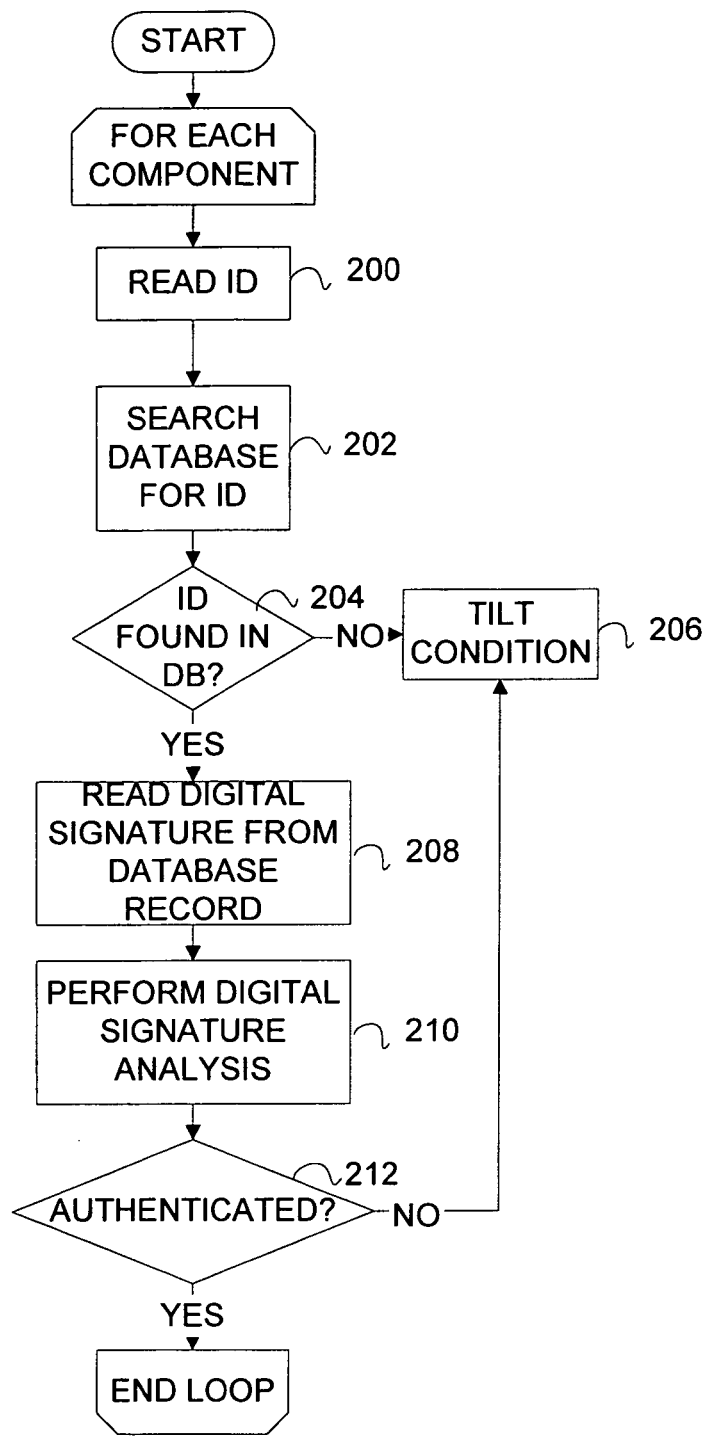
FIG. 2 illustrates the steps for performing verification of the device of FIG. 1.

With reference to FIG. 2, a flow diagram illustrating the steps for performing verification of the device 10 of FIG. 1 is shown. Beginning at step 200, identification numbers of the components 50 are read and then verified. Each identification number is then searched in the datastore 74 to determine whether each identification number is valid, step 202. The determination may be as simple as checking for whether the identification number exists in the datastore. If the identification number is not found in the datastore 74, step 204, then a tilt condition message is generated in the device 10, step 206, which may end operation of the device 10.

Preferably, digital signatures of the digital contents of at least the data files 54 and firmware of the components 50 are also used to perform verification as explained in detail below. In the datastore record where the identification number was located in the datastore 74, an abbreviated bit string, or encrypted signature, created from the data file 54 or firmware of the component 50 when the device 10 was first assembled or before the device 10 was deployed, is stored. The verification software 70 contains instructions that cause the processor 60 to read the signature from the datastore record, step 208. A digital signature analysis is performed, step 210. If the data file 54 or firmware of the component 50 fails an authentication, step 212, then a tilt condition message is generated in the device 10, step 206, which may end operation of the device 10. In the case where a data file 54 comprises one of a plurality of operating system files 98, verification of that file 54, in effect, comprises the verifying part of an operating system 98.

Preferably, the datastore may comprise a relational database, object database, a flat file, an ASCII list, registry entries, an XML file, or any other type of commonly known data listing. However, in the case where storage space is limited for the verification system, a flat file structure for the datastore 74 may be more desirable, and require less software instructions from which to read and retrieve information. The datastore 74 may also comprise an independent system stack of bindings from manufacturers of the components 50, each identification number being verified using the binding from the manufacturer of the respective component 50 to verify the component 50. Especially in the context of smaller devices 10 such as personal digital assistants (PDAs), such a system stack may comprise a subset of one or more global component datastores containing bindings from manufacturers of the components 50, each binding of the subset being associated with at least one of the identification numbers of one of the components 50 in the device 10. Providing such a limited subset helps control the size of the verification system by controlling the size of the datastore 74. Another example of a verification system in which it may be desirable to limit the size of the datastore is one in which the datastore is stored in a personal computer's (PC's) complementary metal oxide semiconductor memory (CMOS) 72, along with other configuration settings for the PC. Storing the datastore in the CMOS 72 may improve security wherein the PC may be configured such that only users with administrative passwords may change the content of the portion of the CMOS 72 containing the datastore 74.

Structural components 130, such as cabinets, may contain an electronic identification chip embedded within them, such as a Dallas chip or an IBUTTON device manufactured by Dallas Semiconductor of Dallas Tex. IBUTTON devices allow a unique identifier, placed within a semiconductor or chip to be placed on a component 50 that may or may not be electronic, such as a computer or gaming machine cabinet 130. The IBUTTON is, in effect, a computer chip enclosed in a 16 mm stainless steel can. It can be mounted, preferably permanently or semi-permanently, on or in the structural component 130.

The searching or algorithmically verifying of each identification number may comprise algorithmically verifying each identification number based on the type of component 50 that the identification number identifies. The identification number and the type of component are algorithmically verified in the datastore in order to verify that the identification number is valid. Each datastore record in the datastore 74 contains the type of component 50 that the identification number in that record is supposed to represent. The type of component 50 may be recognized by the verification software either by the location from which the identification number was read, or by performing a test of each component 50 to determine its type. For example, in some electronic devices 10, the processor 60 may always be located at location 0 on the PCI bus or firmware hub of the device 10. Alternatively, by testing the component 50, the verification software 70 may find registers, which may indicate that the component 50 is a processor 60. Otherwise, the identification number itself may be formatted to indicate the type of component 50.

The reading of the identification numbers and verifying the components 50 may be performed at the time of start-up of the device 10, or periodically during operation of the device 10. Operation of the device may be stopped if any one of the identification numbers are not algorithmically verified in the datastore 74 or if the digital contents of a component 50 are not authenticated with the corresponding digital signature stored in the datastore 74. A tilt condition message is generated by the verification software 70 if any one of the identification numbers is not algorithmically verified in the datastore 74.

The signatures in the datastore 74 are also referred to as bindings. When the components 50 are installed before the device 10 is put into operation in the relevant field of use, at least with respect to the components 50 that comprise data files 54 or contain firmware, a well-known hash function, the Secure Hash Function-1 (SHA-1), may be used for authentication. The SHA-1 computes a 160-bit hash value from the contents of the data file 54 or firmware. This 160-bit hash value, also called an abbreviated bit string, is then processed to create a signature of the game data using an equally well-known, one-way, private signature key technique, the Digital Signature Algorithm (DSA). The DSA uses a private key of a private key/public key pair, and randomly or pseudo-randomly generated integers, to produce a 320-bit signature of the 160-bit hash value of the data file 54 or firmware contents of the component 50. This signature is stored in the datastore 74 in addition to the identification number.

When the device 10 is in operation in the relevant field of use, to perform a verification of the device 10, the verification software executes a DSA verification of the data files 54 and firmware of the components 50. Also stored in the datastore 74 is the public key of the private key/public key pair. For each data file 54 and firmware of each component 54, as part of the DSA verification, the processor 60 and verification software 70 first computes the hash value of the digital contents of the component 50 or data file 54 using the SHA-1 algorithm. The verification software 70 contains instructions that cause the processor 60 to then process or authenticate this computed hash value with the stored signature, using the DSA signature verification algorithm, which also takes, as input, the aforementioned public key stored in the datastore 74. The verification part of the DSA produces a Boolean result (yes or no) as to whether the inputs solve the algorithm. If the algorithm is not solved by the inputs, then an unexpected result is produced, thereby failing to verify the particular component 50 or data file 54. A tilt message is generated which triggers a shut-down mechanism to prohibit the loading operation of the device 10 or to stop operation of the device 10, if verification is performed during operation. Otherwise, use of the device 10 is permitted. A detailed description of the DSA can be found in the U.S. Government's Federal Information Processing Standards Publication (FIPS) 186-2. That publication describes each step of the DSA signature generation and verification.

Alternatively, the verification software 70 may use the Rivest-Shamir-Adleman (RSA) algorithm to verify the components 50. Using the RSA algorithm, a first-abbreviated bit string or hash value is computed from each component's digital contents and encrypted into a digital signature. The digital signature is stored in the datastore 74 along with the identification number for the component 50. When the device is verified, the component 50 is verified by computing a second abbreviated bit string computed from the component's digital contents. The signature is retrieved from the datastore 74 by searching the datastore 74 for the identification number. The signature is decrypted to recover the first abbreviated bit string. The component 50 is then verified by comparing the second abbreviated bit string with the first abbreviated bit string. If the first and second abbreviated bit strings cannot be algorithmically verified, then the component 50 is not verified. A tilt message is generated which triggers a shut-down mechanism to prohibit the loading operation of the device 10 or to stop operation of the device 10 if verification is performed during operation. Otherwise, use of the device 10 is permitted.

Instead of creating a digital signature for, or signing, each data file 54 individually, collections of data files 54 may be signed together in order to speed up processing. The abbreviated bit strings, hash values, or signatures, also called digests, of data files 54 are collected into a catalog file, and the catalog is signed as described above. The verification software 70 identifies each file as being a member of a particular catalog, which can be done by cross referencing the name of the data file or the identification number, in the datastore 74. For verification, abbreviated bit strings are computed from each of the digital files 54, and collected into a catalog, which is itself signed, and then verified using DSA or RSA verification techniques as described above. Thus, the catalog itself becomes a signed data file 54 that is verified, just as if it was an individual data file 54.

Figure 3:
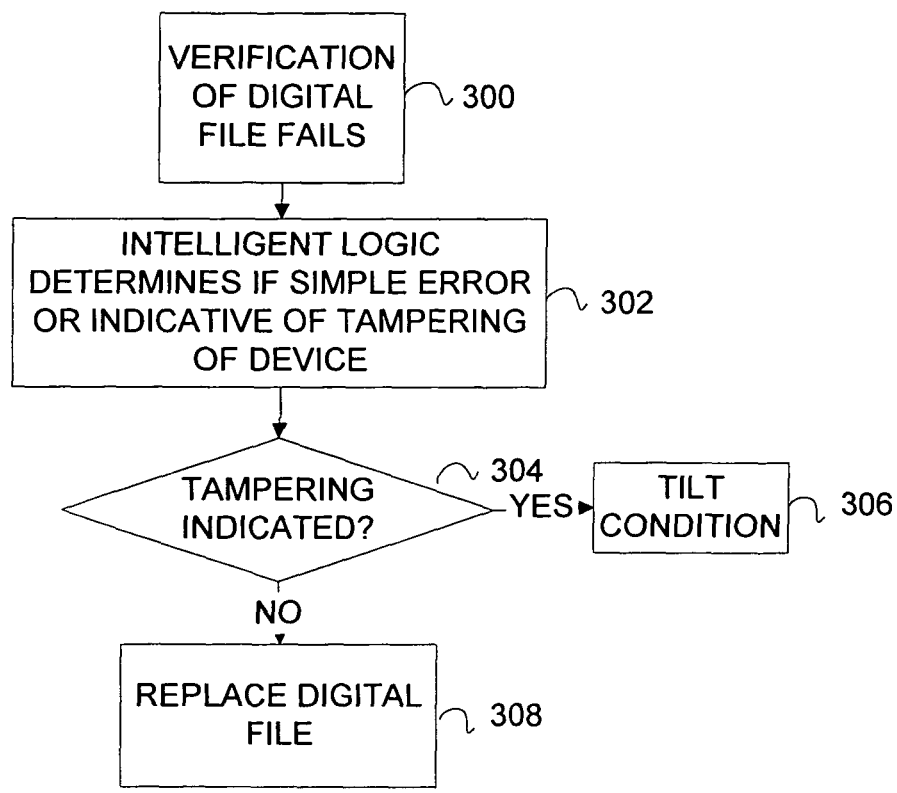
FIG. 3 illustrates the steps performed by the system of FIG. 1 for replacing data files that are unverified or contain errors.

With reference to FIG. 3, a flow diagram illustrating the steps performed by the system of FIG. 1 for replacing data files 54 that are unverified or contain errors is shown. In some cases, it may be desirable to nevertheless allow operation of a device 10 even though a data file 54 failed verification. For example, that data file 54 may contain an error caused by a number of events, such as a bad sector on the hard disk 90, which in turn caused the failed verification of that data file 54. In that example, the failed verification is evidently not due to tampering of the device 10 as the system of the claimed invention is generally designed to prevent. Still, operation of the device 10 is not desirable unless and until the error in the data file 54 is corrected. When the data file 54 is stored in alterable media 90, correcting such an error may be as simple as replacing the file 54. Along with the identification number and encrypted signature or abbreviated bit string, a valid replacement data file 44 may also be stored in the datastore 74. Starting with step 300, the verification software 70 finds an invalid data file 54 as described above with reference to FIG. 2. The verification software 70 may contain logic that examines the failed verification to determine whether the cause of the invalid data file 54 is simply an error in the data file 54, and not tampering, step 302. Such logic may comprise, for example, fuzzy logic, which uses historical data to determine if the circumstances surrounding the failed verification most likely indicate a simple error instead of tampering. A number of factors may be used by the verification software 70 to make such a determination. For example, determination may be based on the number of data files 54 or components that fail verification. Historical data in the fuzzy logic may show that having a certain percentage of failed verifications may indicate tampering of the device 10. This may indicate a deceptive replacement of the hard disk 90 in the device 10, for example. If the verification software indicates that tampering of the device 10 was most likely to have occurred, step 304, then a tilt message is generated, step 306. Otherwise, a replacement data file 54 is pulled from the datastore 74 to replace the data file 54 that failed the validation, step 308.

Alternatively, storing the replacement, or update, files in the datastore 74, the update files may be located in the CDROM or CD-RW device 80 as indicated at 82. Storing the update files 82 on the CD device 80 is preferable if the data files 54 are large, while the datastore 74 itself remains stored securely in the BIOS+ 64. The update files 82 are organized in a large update file datastore 74 for easy indexing by identification number.

Figure 4:
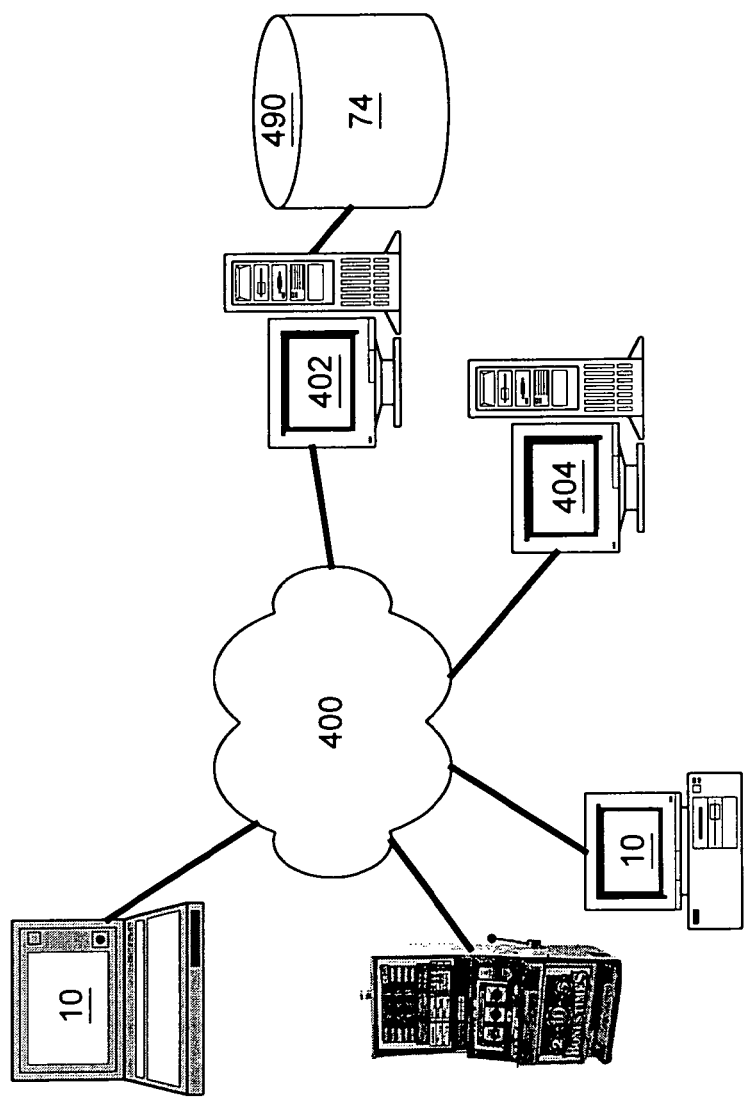
FIG. 4 illustrates the structure of a network that may be used with the device of FIG. 1.

With reference to FIG. 4, a block diagram illustrating the structure of a network that may be used with the device of FIG. 1 is shown. In one embodiment, the datastore 74 is remote from the device 10, or a plurality of devices 10, wherein verification is performed over a network 400 connecting a database server 402 containing the datastore 74 with the device 10. The datastore 74 is stored in a persistent storage media 490 inside or connected to the database server 402. The device transmits the identification numbers for each of the components 50 (FIG. 1) to the database server 402. The database server 402 then performs the step of algorithmically verifying use of its own version of the verification software 70 described herein. For example, the device 10 may be a personal computer (PC), with verification being performed before a transaction is allowed on a network server 404. A prime example of such a system is one set up for performing banking transactions with the network server 404 owned or operated by a bank. In such a system, a bank may only allow trusted transactions using an authorized PC 10 whose bindings for all of the components 50 and banking transaction software (92 in FIG. 1) have been recorded in the datastore 74. The datastore may be either located on the bank's network server 404, or the remote network server 402. Once all of the components have been verified, the bank's network server 402 then allows transactions to take place using the PC 10.

In another example, the device 10 comprises a gaming machine 10, wherein the verification of the gaming machine 10 is performed before game play is allowed on the gaming machine. The datastore 74 may either be located in a secure location in the gaming machine 10, such as a ROM device 77 enclosed in a lock box within the gaming machine 10, or remotely from the gaming machine 10 so that the gaming machine 10 connects to the network server 402 containing the datastore 74 over the network 400. As with the banking personal computer 10 described above, the components 50 of the gaming machine 10 are verified at the network server 402 after the gaming machine 10 transmits the identification numbers, hash values, and the like, to the network server 402.

Another aspect of the claimed invention is a method and system for recording event messages in a gaming machine 10. The device 10 may comprise a gaming machine 10, which contains a monitor 108 for monitoring one or more system events being processed by the gaming machine 10. The monitor 108 may comprise a set of executable instructions, or a software program, which may be located in a variety of places within the gaming machine 10 ready for loading into RAM 76 for execution by the processor during operation of the gaming machine 10. For example, the monitor 108 may be stored on the hard disk 90, ROM 77 or BBRAM 62. Preferably, the operating system 98 of the gaming machine 10 is event driven. In an event-driven system or device 10, applications 92 and components 50 respond to input from the user (mouse movement, keystrokes, menu choices, and the like), and messages from other applications 92 and components 50. This is in contrast to, for example, a batch operation that continuously processes the next item from a group of instructions. The monitor 108 comprises an event-management system, which comprises software or firmware that monitors the applications 92, operating system 98 processes, and other components 50 of the device. Alternatively, at least parts of the monitor 108 may be located on a remote server 402, workstation or other network devices.

Figure 5:
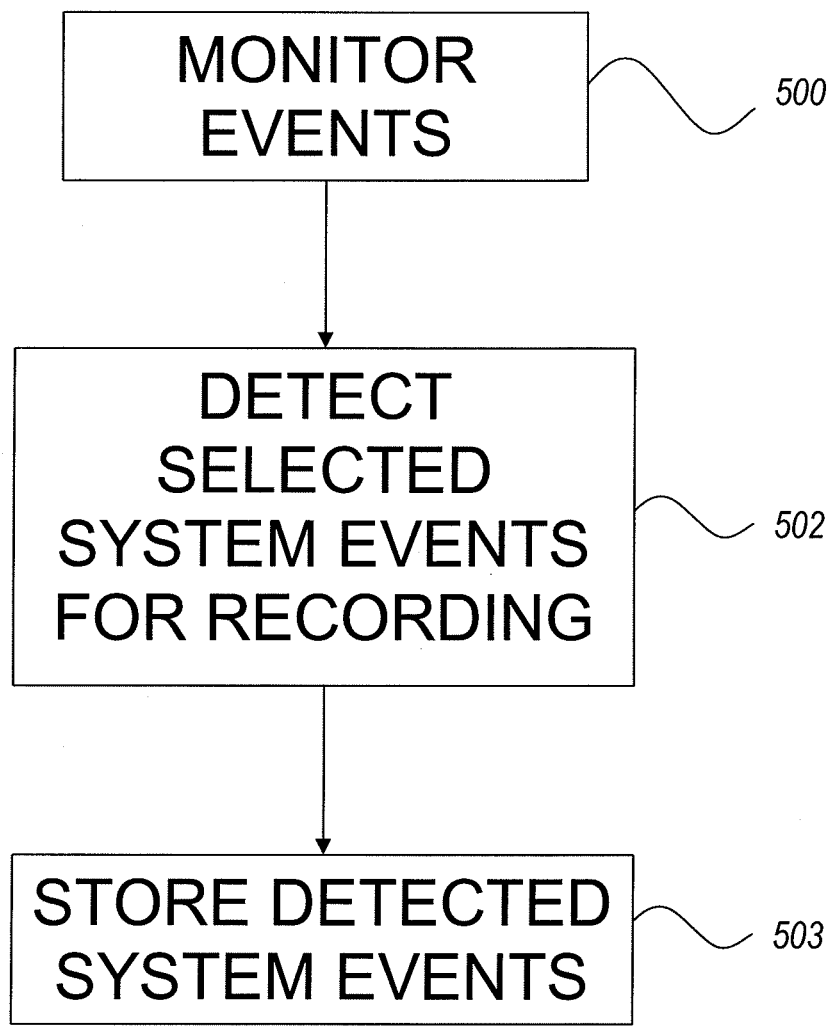
FIG. 5 illustrates the steps preformed by a monitor in a gaming machine embodiment of FIG. 1.

With reference to FIG. 5, a flow diagram illustrating the steps preformed by the monitor 108 and gaming machine 10 is shown. The monitor 108, which may alternatively comprise both hardware and software components 50 in the device 10, such as its own processor 60 and event management software 92, monitors routine and non-routine events or event messages generated in the gaming device, step 500. As an example, a coin insertion into the gaming machine 10 will trigger a corresponding routine coin-in event message that triggers components 50 to operate and/or software instructions to execute. Similarly, an exception fault or divide by zero condition will trigger a non-routine or error event message to be generated. These event messages can be generally referred to as system events or event messages.

Either included within the monitor 108, or separately but in close coordination with the monitor 108, is a detector 110 for detecting selected system events of the one or more system events so that they may be recorded, step 502. The gaming machine 10, or the remote server 402 monitoring the gaming machine 10, stores the event message for the detected system event in a log file 104 on a persistent storage device such as the hard disk 90 or a persistent storage media 490 on the remote server 402.

In the step of detecting, step 502, each monitored system event is of a certain type, which, for reference purposes, can be referred to as a system event type. The detector 110 selects the selected system event based on the system event type for the selected system event. The system event type may, for example, comprise a code in the event message that indicates a category of events that occur in the gaming machine 10 that the system event belongs to or from which the event message was generated. For example, the previously mentioned coin-in, exception fault and divide by zero system events are each so identified with the system event type. In step 502, the detector 110 selects the selected system event by comparing the system event type for each monitored system event to a list of system event types, and selecting one of the monitored system events for the selected system event if the system event type for the selected monitored system event algorithmically verifies one of the system event types in the list. Each system event is monitored and as the detector selects a plurality of system events based on their types, the system event messages for each selected system event is stored in the log file 104 on the hard disk 90. The list may be stored in an index or lookup file 112 on the hard disk 90. The lookup file may comprise a datastore file 112, which may be relational, object-based, or in XML format, for example.

A buffer region of the RAM 76 may be set aside for buffering a plurality of the monitored system events, wherein the step of storing, step 503, comprises storing one or more of the buffered system events in the log file 104 each time one of the system event types for storing is detected in step 502 by the detector 110. Preferably, the buffer in RAM 76 should be large enough so that at least the last 1000 system events may be stored in the buffer, and then written to the log file 104 if a selected system event is detected and stored. The buffer in RAM 76 is thus operated as a first-in-first-out stack of system event messages.

Other digital contents of memories 62 and 76, or components 50 in the gaming machine 10 may be stored upon detection of a selected system event. It may be desirable to store the entire contents of a memory of a component 50, selected contents of a memory of a component 50, or selected or entire values for registers of a processor component 60 of the gaming machine 10. If a selected system event is a memory protection exception error, then it may be desirable to store at least the contents of the protected memory in RAM 76 that was violated and memory allocation tables for the offending application(s) that caused the error. Even if the memory portion in which the protection exception error occurred comprises a safe RAM or battery-backed memory device 62, it nevertheless still may be desirable to store the contents of that memory 62 in case other applications should further modify the memory 62.

Figure 6:
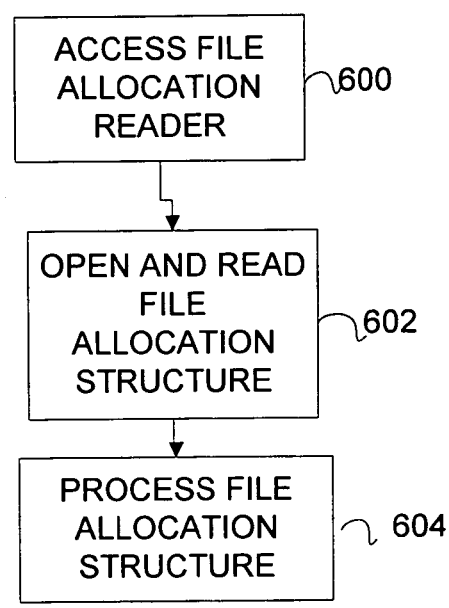
FIG. 6 illustrates the steps for reading a file allocation structure or file allocation table of a persistent storage media in the device of FIG. 1.

With reference to FIG. 6, a logical flow diagram illustrating the steps for reading a file allocation structure or file allocation table 99 of a persistent storage media is shown. In another aspect of the claimed invention, it is desirable to perform operations on data files 54 stored on the persistent storage media, such as verification operations, either (1) before the operating system 98 of an electronic device 10 is loaded or (2) without the need for the operating system 98 of an electronic device 10. Typically, the operating system 98 must be loaded, and started or booted, in order to perform file access operations on persistent storage media 90. This is because the operating system usually exclusively contains the file access system used to read the file allocation structure 99 stored on the storage media 90. However, in some devices 10, it would be desirable to validate data files 54 on the persistent storage media 90 before booting the operating system 99 for, among other reasons, security purposes.

In that regard, the system of the claimed invention has a file allocation reader 76 stored in the BIOS or FWH 64. This makes accessing files stored in the persistent storage media 90 possible in the absence of a running operating system 98. The processor 60 may access the file allocation reader 76 stored in the BIOS, step 600, to open the file allocation structure 99 on the persistent storage media 90 and to read it, step 602. The file allocation reader 76 is a computer program which comprises a set of executable instructions for processing the file allocation structure such as that used by the operating system 98. For faster access, the processor 60 may move the contents of the file allocation structure 99 into a RAM 76. The processor 60 may then process the file allocation structure 604 to provide access to files stored in the storage device.

An example of such an application that may benefit from this new functionality in the BIOS 64 is the verification software 70 described above for verifying software components or data files 54 on the persistent storage media 90. In that case, operating system files 98 may be verified before loading or booting, or before any software program 92 is run from the persistent storage media 90. This makes the verification software 70 completely independent of data files 54 stored on the persistent storage media 90 which are being verified. Alternatively, volatile storage media, such as random access memory (RAM), could be utilized instead of, or in addition to, persistent storage media 90.

As described above, verifying the data files 54 may comprise verifying each data file 54 by retrieving a first abbreviated bit string computed from the file from the datastore 74, computing a second abbreviated bit string from the data file 54, and verifying the file by authenticating the second abbreviated bit string using the first abbreviated bit string. As described above, the datastore of signatures or abbreviated bit strings 74 may be stored in the BIOS 64 as well, wherein the verification software uses DSA or RSA to verify each data file 54 against the corresponding signature or abbreviated bit string stored in the datastore 74. The file allocation reader 76 in the BIOS or FWH 64 may be configured to read a 32-bit based file allocation table 99, a 16-bit based file allocation table 99, a WINDOWS NT file system structure 99, or any other file allocation structures 99 used by the persistent storage media 90.

Referring again to FIGS. 1 and 4, another preferred embodiment is directed towards a method for verifying one or more downloaded components 54 of a gaming device 10, wherein the gaming device has an alterable hard drive 80 (or other persistent storage media 90) and the downloaded components include gaming-related content 92-96. In one embodiment, the method includes: enabling initiation of a game on the gaming device 10; downloading gaming-related content 92-96 to the alterable hard drive 80 while the gaming device 10 is enabled for game play; reading an identifier associated with the gaming-related content 92-96; verifying that the identifier is valid (using verification software 70); and reconfiguring the gaming device 10 to utilize the newly-downloaded, gaming-related content 92-96 in response to an initiating event. Initiating events, as described above, are events that have been approved by gaming regulators to begin the installation and/or reconfiguration of the newly-downloaded, gaming-related content. In another embodiment, the gaming device utilizes volatile storage media, such as random access memory (RAM), instead of, or in addition to, persistent storage media 90.

Preferably, this method further includes writing the downloaded gaming-related content 92-96 to the alterable hard drive 80 while the gaming device is enabled for game play. In another preferred embodiment, the downloading of gaming-related content 92-96 to the alterable hard drive 80 occurs while the gaming device 10 is active. Yet in another embodiment, the gaming-related content 92-96 is downloadable to a separate partition area of the alterable hard drive 80 while the gaming device is enabled for game play. In such embodiments, downloaded gaming-related content 92-96 is preferably escrowed (or otherwise downloaded to some type of staging area) for later authentication. For example (and not by way of limitation), a first game may be in progress while a second game (e.g., gaming-related content 92-96) is downloaded and written to some portion of the alterable hard drive 80 for later authentication. In this manner the apparent download time for changing or otherwise reconfiguring games is significantly reduced while still allowing for adequate safeguards to meet gaming regulations. Preferably, these adequate safeguards include verification methods such as RSA, DSA and SHA-1, which have been discussed in detail above.

A preferred method also includes algorithmic verification associated with the identifier associated with the gaming-related content 92-96 to a number in a datastore 74 to determine whether the identifier associated with the gaming-related content is valid. Typically, this algorithmic verification is performed using executable instructions or verification software 70. Preferably, the downloaded components 54 include data files. Further, the data files preferably include software program files, such as gaming-related content 92-96. In one preferred embodiment, the method also includes replacing a file if the file is not valid. Additionally, the method also preferably includes preventing utilization of the gaming-related content 92-96 if the identifier is not algorithmically verified in the datastore 74. Preferably, the method also includes generating a tilt condition message if the identifier is not algorithmically verified in the datastore 74.

In one preferred embodiment, the datastore 74 is remote from the gaming device 10 and the verification is performed over a network 400 that connects a database server 402 containing the datastore with the gaming device. Preferably, the gaming device 10 transmits the identifier for each component 54 to the database server 402, and the database server performing the step of algorithmically verification. In one embodiment, the gaming device 10 includes a computer having one or more components 54 that must be verified, preferably using verification software 70, before a transaction is allowed on the server. Further, in one preferred embodiment, a network server 404 contains the database server 402. Preferably, the datastore 74 comprises a relational database or an object database and is in XML format. Additionally, the datastore 74 preferably comprises an independent system stack of bindings, and an identifier is verified using a binding to verify a downloaded component 54. Preferably, the datastore 74 is stored in CMOS 72 memory or in BIOS 64.

Referring again to FIG. 1, in a preferred embodiment system for verifying a downloaded component 54 of a gaming device 10, the gaming device has an alterable hard drive 80 and the downloaded component includes gaming-related content 92-96. The system includes a gaming device 10 for playing a game, wherein gaming-related content 92-96 is downloadable to the alterable hard drive 80 while the gaming device is enabled for game play. The system includes a processor 60 for reading an identifier associated with the gaming-related content 92-96 and for verifying that the identifier is valid. The gaming device 10 is reconfigured to utilize the newly-downloaded, gaming-related content 92-96 after the gaming-related content has been verified in response to an initiating event. Initiating events, as described above, are events that have been approved by gaming regulators to begin the installation and/or reconfiguration of the newly-downloaded, gaming-related content.

Preferably, the system further includes one or more sets of executable instructions that are executed by the processor 60, wherein the executable instructions enable reading and verifying the identifiers. In a preferred embodiment, the system further includes a persistent storage media 90. Preferably, at least one of the one or more sets of executable instructions is stored in persistent storage media 90. In a preferred embodiment, the persistent storage media 90 can be a basic input-output chip (BIOS) 64, a firmware hub, flash memory, and/or a hard disk device. Additionally, the persistent storage media 90 is preferably a removable storage unit, including by way of example only, and not by way of limitation: a CD-ROM reader, a WORM device, a CD-RW device, a floppy disk device, a removable hard disk device, a ZIP disk device, a JAZZ disk device, a DVD device, a removable flash memory device, and a hard card device. Alternatively, the system utilizes volatile storage media, such as random access memory (RAM), instead of, or in addition to, persistent storage media 90.

Preferably, the processor 60 reads and verifies the identifier in response to an initiating event. In such a preferred embodiment, the processor 60 reads and verifies the identifier periodically while the gaming device is not enabled for game play. Referring again to FIG. 4, the gaming device 10 is capable of connecting to a network 400, wherein the datastore 74 is stored on a server that is remote from the gaming device, and wherein the processor 60 transmits an identifier to the server to algorithmically verify an identifier in the datastore.

Referring now to FIG. 7, in a preferred method for verifying a downloaded component 54 of a gaming device 10, the gaming device has an alterable hard drive 80 and the downloaded component includes gaming-related content 92-96 having one or more modular components that are downloadable with a manifest. The method includes: at Step 700, enabling initiation of a game on the gaming device 10; at Step 710, downloading gaming-related content 92-96 to the alterable storage media 80 while the gaming device 10 is enabled for game play; at Step 720, reading an identifier associated with the gaming-related content; at Step 730, verifying that the identifier is valid; at Step 740, reconfiguring the gaming device to utilize at least one modular component of the newly-downloaded and authenticated gaming-related content in response to an initiating event; and at Step 750, while the gaming machine is being reconfigured and is disabled for game play, displaying a player-viewable reconfiguration announcement.

Finally, in another preferred system for verifying a downloaded component 54 of a gaming device 10, once again, the gaming device has an alterable hard drive 80 and the downloaded component 54 includes gaming-related content 92-96. The system includes a gaming device 10 for playing a game, a datastore 74, and a processor 60. In the gaming device 10, the gaming-related content 92-96 that contains one or more data sets is downloadable to the alterable hard drive 80 while the gaming device is enabled for game play. The datastore 74 contains a first abbreviated bit string computed from each of the one or more data sets that have been download with a manifest. Additionally, the processor 60 computes a second abbreviated bit string from each of the one or more data sets, and verifies each data set by authenticating the second abbreviated bit string computed from the data set using the first abbreviated bit string. Preferably, the gaming device 10 is reconfigured to utilize the newly-downloaded, gaming-related content 92-96 after the gaming-related content has been verified in response to an initiating event. Further, in one preferred embodiment, the alterable hard drive 80 is replaced or supplemented with another type of alterable storage media 90.

Furthermore, the various methodologies described above are provided by way of illustration only and should not be construed to limit the invention. Those skilled in the art will readily recognize various modifications, and changes may be made to the claimed invention without departing from the true spirit and scope of the claimed invention. Accordingly, it is not intended that the invention be limited, except as by the appended claims.

What is claimed:

1. A casino gaming device comprising an alterable storage media configured to store a downloaded component comprising casino gaming-related content, the casino gaming device comprising:
   a processor and a memory containing embedded executable instructions executed by the processor to:
      enable initiation of a casino game on the gaming device,
      download gaming-related content to the alterable storage media while the casino gaming device is enabled for casino game play, wherein the downloading of casino gaming-related content is non-player initiated,
      read an identifier associated with the gaming-related content;
      determine if the identifier is valid, and reconfigure the casino gaming device to utilize the newly-downloaded, gaming-related content in response to an initiating event if the identifier is valid, or
      determine if tampering with the downloaded gaming-related content has occurred and attempt to replace the downloaded gaming-related content if the identifier is invalid and only if tampering has not been determined.

2. The casino gaming device of claim 1, wherein the alterable storage media comprises an alterable hard drive and the downloaded gaming-related content is authenticated on the alterable hard drive by the processor according to the embedded executable instructions while the gaming device is enabled for game play.

3. The casino gaming device of claim 1, wherein the alterable storage media comprises an alterable hard drive and the downloaded gaming-related content is authenticated on the alterable hard drive by the processor according to the embedded executable instructions in response to an initiating event.

4. The casino gaming device of claim 1, wherein the alterable storage media comprises an alterable hard drive and the gaming-related content is downloadable to a separate partition area of the alterable hard drive while the gaming device is enabled for game play, and wherein downloaded gaming-related content is escrowed by the processor according to the embedded executable instructions for later authentication by the processor according to the embedded executable instructions.

5. The casino gaming device of claim 1, wherein the gaming-related content is downloadable to a staging area by the processor according to the embedded executable instructions while the gaming device is enabled for game play, and wherein downloaded gaming-related content is escrowed for later authentication by the processor according to the embedded executable instructions.

6. The casino gaming device of claim 1, wherein determining if the identifier is valid comprises algorithmically verifying the identifier associated with the gaming-related content to a value in a datastore.

7. The casino gaming device of claim 6, further comprising the prevention of utilization of the gaming-related content by the processor according to the embedded executable instructions if the identifier is not algorithmically verified in the datastore.

8. The casino gaming device of claim 6, wherein the datastore is remote from the gaming device, wherein the determination is performed over a network that connects the gaming device with a database server containing the datastore, and wherein the gaming device processor, according to the embedded executable instructions, transmits an identifier for each of the components to the database server where the verifying step is performed.

9. The casino gaming device of claim 1, wherein the gaming device further comprises persistent storage media.

10. The casino gaming device of claim 9, wherein the persistent storage media is a removable storage unit selected from the group consisting of: a CD-ROM device, a WORM device, a CD-RW device, a floppy disk device, a removable hard disk device, a ZIP disk device, a JAZZ disk device, a DVD device, a removable flash memory device, and a hard card device.

11. The casino gaming device of claim 1, wherein unsecured components are downloaded across an unsecured network to the gaming device, and wherein the validity of the components is determined in the gaming device by the processor according to the embedded executable instructions in response to an initiating event.

12. The casino gaming device of claim 1, wherein a reconfiguration announcement is displayed by the processor according to the embedded executable instructions when the gaming machine is reconfigured by the processor according to the embedded executable instructions using the downloaded gaming-related content.

13. The casino gaming device of claim 1, wherein the gaming machine is reconfigured by the processor according to the embedded executable instructions using gaming-related content while the gaming machine is disabled for game play and a reconfiguration announcement is displayed by the processor according to the embedded executable instructions.

14. The casino gaming device of claim 1, wherein the gaming-related content is downloaded by the processor according to the embedded executable instructions from a server via a network.

15. The casino gaming device of claim 1, wherein the gaming-related content is downloaded by the processor according to the embedded executable instructions from a portable device that is connected to the gaming device without requiring an interconnecting network.

* * * * *